United States Patent [19]
Klimek

[11] 3,759,584
[45] Sept. 18, 1973

[54] PARKING BRAKE CONTROL VALVE
[75] Inventor: Boleslaw Klimek, Des Plaines, Ill.
[73] Assignee: The Berg Manufacturing Company, Des Plaines, Ill.
[22] Filed: Oct. 4, 1971
[21] Appl. No.: 186,290

Related U.S. Application Data
[63] Continuation-in-part of Ser. No. 161,176, July 9, 1971, abandoned.

[52] U.S. Cl. ............................................. 303/71
[51] Int. Cl. ........................................... B60t 13/22
[58] Field of Search ................... 303/71; 137/630.19

[56] References Cited
UNITED STATES PATENTS
| | | | |
|---|---|---|---|
| 3,224,815 | 12/1965 | Horowitz | 303/71 |
| 3,572,846 | 3/1971 | Cruse | 303/71 |
| 3,532,396 | 10/1970 | Carton | 303/71 |
| 3,419,315 | 12/1968 | Bueler | 303/71 |
| 3,107,126 | 11/1963 | Valentine | 303/71 |

*Primary Examiner*—Lloyd L. King
*Attorney*—Howard T. Markey et al.

[57] ABSTRACT

A parking brake hand control valve assembly wherein an operating shaft is movable in one direction to transmit fluid pressure through said valve from a first source and movable further in the same direction to transmit fluid pressure through said valve from a second source and a shuttle valve assembly precludes loss of pressure from said first source and the brake system to said second source.

9 Claims, 2 Drawing Figures

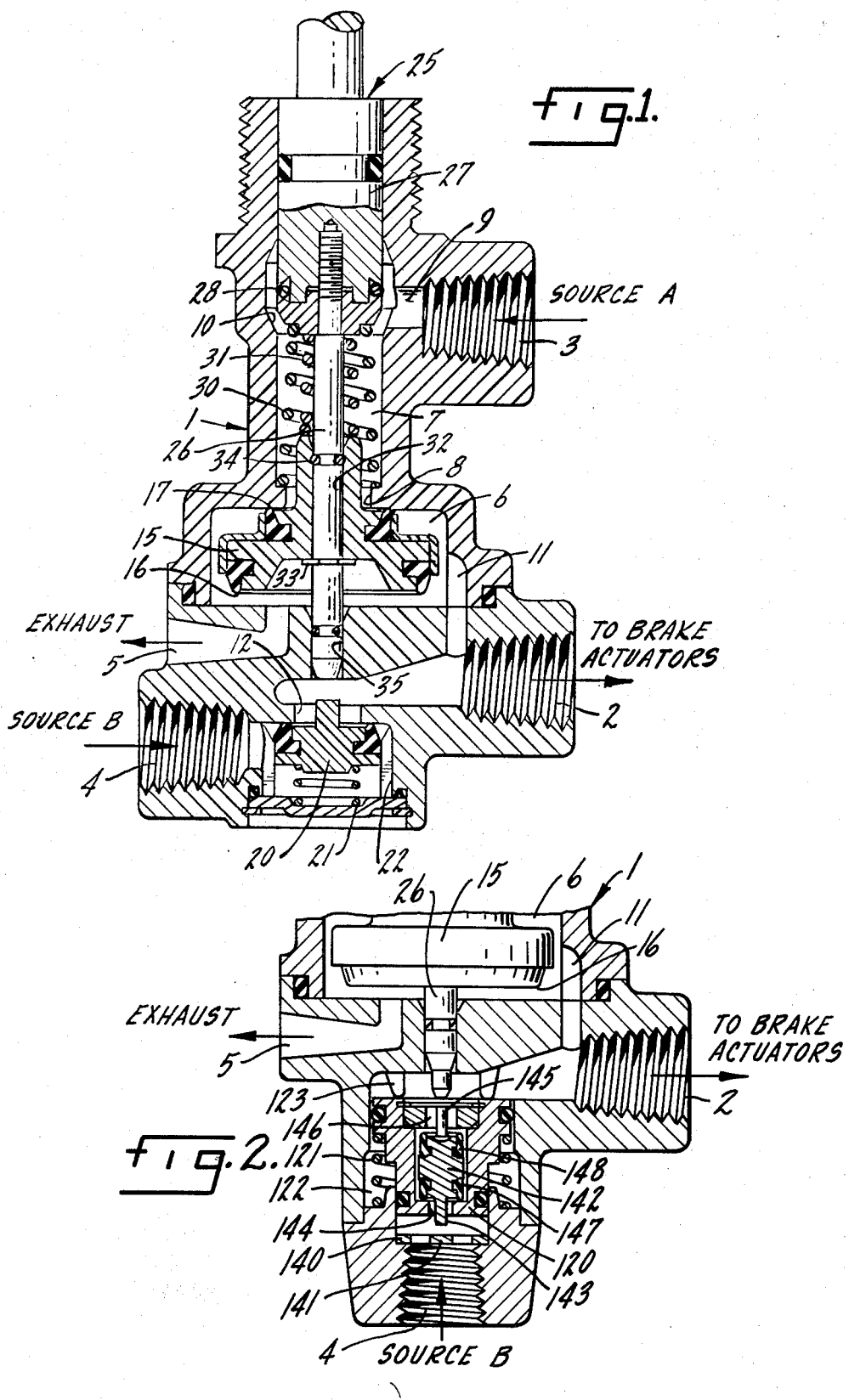

PARKING BRAKE CONTROL VALVE

SUMMARY OF THE INVENTION

This application is a continuation-in-part of application Ser. No. 161,176, filed July 9, 1971, now abandoned, and entitled "Parking Brake Control Valve."

This invention relates to vehicle brake systems and particularly to parking brake systems usable on tractor-trailer vehicles.

Such parking brake systems normally employ spring-applied, fluid pressure-released brake actuators and both a normal and an auxiliary or protected source of fluid pressure. It is, accordingly, one purpose of the invention to provide a hand control valve available to the vehicle operator for manual operation, which valve shall be movable in one direction to evacuate such actuators and permit the springs therein to apply the vehicle brakes and movable in the opposite direction a first distance to supply fluid pressure to said actuators from said normal source and movable a further distance in said opposite direction to supply fluid pressure to said actuator from said auxiliary source.

Another purpose is to provide a valve of the type described above which shall be of maximum simplicity and economy in manufacture and use.

Another purpose is to provide a valve of the type described above which shall be composed of a minimum number of parts.

Another purpose is to provide a valve of the type described having a positive mechanical contact means insuring availability of fluid pressure through said valve from said auxiliary source.

Another purpose is to provide such a control valve having an isolated valve means for supplying pressure from an alternate pressure source.

Another pressure is to provide a control valve of the type described for dual-source systems which includes means precluding loss of fluid pressure from the first fluid pressure source or from the parking brake system in response to failure of pressure at the alternate source.

Other purposes may appear from time to time during the course of the specification and claims.

BRIEF DESCRIPTION OF THE DISCLOSURE

The invention is illustrated more or less diagrammatically in the accompanying drawings wherein:

FIG. 1 is a side elevation in partial cross section; and

FIG. 2 is a detailed view illustrating a modified version of a portion of the structure of FIG. 1.

Referring now to FIG. 1, the numeral 1 generally designates a valve housing. Indicated at 2 is a fluid pressure outlet port provided for connection with suitable conduits to deliver fluid pressure to the brake actuators of the vehicle. Indicated at 3 is a fluid pressure inlet port provided for reception of fluid pressure from a normal fluid pressure source indicated in FIG. 1 as source A.

A second fluid pressure inlet port 4 is provided for connection with an auxiliary or protected tank or reservoir of fluid pressure indicated in FIG. 1 as source B. An exhaust outlet port 5 is provided to communicate a first valve chamber 6 with atmosphere. A second chamber 7 communicates through passage 8 with chamber 6 and at its opposite end through passage 9 with inlet 3, the chamber 7 being expanded or enlarged as indicated at 10 adjacent passage 9. Chamber 6 communicates with outlet 2 through passage 11. Inlet 4 communicates with outlet 2 through passage 12 and with exhaust outlet 5 through passage 11 and chamber 6.

A first valve member 15 is reciprocal in chamber 6 and carries first valve face 16 in position to close exhaust outlet 5 and an opposite valve face 17 positioned to close passage 8.

A second valve member 20 is yieldingly urged, as by spring 21, into position closing passage 12. It will be observed that the valve member 20 is reciprocal in a chamber 22 communicating with inlet 4 and providing a fluid pressure receiving area behind valve member 20.

Reciprocably slidable in the housing 1 is a valve operating means generally indicated by the numeral 25. Means 25 includes a shaft portion 26 of relatively limited diameter and a shaft portion 27 of greater diameter. The portion 27 carries seal means 28 movable between a nonsealing position within the enlarged chamber area 10 and a sealing position within the normal chamber area 7 between passages 9 and 8 to seal the same against communication.

A first yielding means 30 of predetermined force is positioned in chamber 7 and engages housing 1 and enlarged shaft portion 27 to urge the means 25 rearwardly or outwardly of housing 1 into the position shown in FIG. 1. A second yielding means 31, of somewhat greater force, engages the enlarged shaft portion 27 and the valve member 15 to urge the same in opposite directions.

Shaft portion 26 extends slidably through a central bore in member 15, as indicated at 32. A shoulder 33 is carried by shaft portion 26 beyond member 15 to limit retrograde movement of shaft portion 26 with respect to valve 15 and seal means 34 is carried by shaft portion 26 for engagement with the bore of valve member 15. Shaft portion 26 has a distal portion slidably and sealingly reciprocal in a central bore 35 of housing 1, the end surface of shaft portion 26 being positioned for operating contact with valve member 20 when the shaft 26 has traversed a sufficient distance forwardly or inwardly into housing 1.

Referring now to FIG. 2, it will be understood that the structure therein illustrated replaces passage 12, valve member 20 and chamber 22, the inlet 4 being conveniently repositioned with respect to housing 1. A shuttle piston 120 is urged by spring 121 within a chamber 122 and upwardly, as the parts are shown, against circumferentially spaced legs or stop means 123 within which the distal portion of shaft portion 26 is located when the parts are in the position shown in FIG. 2.

Positioned beneath shuttle piston 120 and in inlet 4 is a spoke or web washer 140 having openings spaced about a central abutment 141.

Within a chamber in shuttle piston 120 a shuttle valve member 142 is freely reciprocal and carries an axial extension 143. The axial extension 143 passes through an axial passage 144 in the bottom of shuttle piston 120, as the parts are shown, for contact with washer abutment 141 at one stage in the operation of the device. An oppositely directed axial extension 145 on member 142 passes through an axial passage 146 in the top of shuttle piston 120 and approaches shaft end portion 126 in alignment therewith and for contact thereby. Seals 147 and 148 are carried by valve member 142 for closing, respectively and alternatively, passages 144 and 146 to preclude flow of fluid pressure from chamber 6 to the source B below a predetermined pressure level and preclude flow of fluid pressure from source B into chamber 6 or outlet 2 above said pressure level.

The use and operation of the invention are as follows:

As illustrated in FIG. 1, the control valve assembly of the invention is in its brakes-on position, the parts being urged thereinto by spring 30. In such position the outlet 2, and thus the brake actuators of the brake system, are exhausted to atmosphere through passage 11, chamber 6 and outlet 5. Valve face 17 seals inlet 3 and valve 20 seals inlet 4 against loss of pressure to atmosphere.

When the operator desires to release the brakes and thus to permit vehicle movement, the operator merely presses forward on means 25, a suitable handle element (not shown) being provided thereon externally of housing 1. Since spring 31 is of a force greater than that of spring 30, forward movement of means 25 is effective to overcome spring 30 and yet, through the mediacy of spring 31, to move valve member 15 into position closing exhaust outlet 5 and opening communication of normal fluid pressure inlet 3 with outlet 2 through passage 9, chamber 7, passage 8, chamber 6 and passage 11.

Limited inward movement of means 25 sufficient to seat valve 15 and open passage 8 is insufficient to bring seal means 28 into sealing contact with the normal inner diameter of chamber 7. The fluid pressure supplied at inlet 3, operative now against the larger diameter of valve 15, is sufficient to retain valve means 15 in its position closing outlet 5 and communicating inlet 3 with outlet 2, spring 30 being of insufficient force to overcome the normal predetermined pressure at inlet 3 when valve 15 is in said position.

Said inward movement of means 25 is insufficient, however, to bring the distal end of shaft portion 26 into opening engagement with valve member 20. Hence the auxiliary or protected tank indicated as source B remains independent and unaffected.

Should the vehicle operator thereafter wish to apply the brakes of the vehicle, in any emergency or for parking purposes, the operator merely draws the means 25 rearwardly or toward himself, the shoulder 33 engaging valve 15 and moving it into the position shown, exhausting outlet 2 and thus the brake actuators (not shown) to atmosphere and permitting the springs in said actuators to apply the brakes.

Similarly, a failure of fluid pressure at inlet 3 results automatically in return of the parts to the position shown, through the mediacy of spring 30, to apply the brakes of the vehicle. Should the vehicle operator then wish to release the brakes, pressure at inlet 3 being absent or insufficient, to permit movement of the vehicle for example from the highway, the operator merely presses the means 25 to its full overtravel position inwardly of housing 1, the operator overcoming the resistance of spring 31 and moving the end of shaft portion 26 into contact with valve member 20 to open it against the action of spring 21. Thereupon fluid pressure will flow from source B to outlet 2 and will be transmitted through the valve of the invention to the brake actuators to release the brakes and permit vehicle movement. In the initial portion of such inward movement of means 25 the valve 15 will have been moved into position closing exhaust outlet 5. Similarly, the continued inward movement of means 25 brings seal 28 into sealing contact with the normal diameter of chamber 7 to close passage 9 and inlet 3 against communication with outlet 2.

Since fluid pressure from source B would, in such event, remain on both sides of member 20, withdrawal of shaft 26 permits spring 21 to close valve member 20 and the operator must therefore hold means 25 inwardly to retain the member 20 in open position for as long as the operator desires that the brakes be released. Upon the operator's relaxation of inward pressure on means 25, the parts will be returned to the position shown in FIG. 1 and the brake actuators will be exhausted through outlet 2, passage 11, chamber 6 and exhaust outlet 5 to again apply the brakes, the member 20 closing to protect the source B against loss of pressure.

In the variant form of the invention wherein the lower portion of the structure shown in FIG. 1 is replaced by that shown in FIG. 2, means are provided for preventing the loss of all of the fluid pressure from the total system in the event of a leak or diminution of pressure in the alternate source B. In such event fluid pressure would not be available to release the spring brakes in an emergency situation. A predetermined pressure level is established which may, for example, be 60 psi. When, for example, the pressure in the system, and thus in chamber 6, is greater than 60 psi, the shuttle 120 will be moved against the action of spring 121, or downwardly as the parts are shown, to bring extension 143 into contact with abutment stop 141 to open a path through the assembly 120,142 and to permit flow of fluid pressure from chamber 6 to the source B to fill the same. At pressures in chamber 6 below 60 psi the seal 147 precludes such flow of fluid pressure from chamber 6 to source B. Valve member 142 operates as a double check valve to protect also against the flow of high pressure in source B into the system. The seal 148 being held closed against passage 146 by such high pressure but being operable manually by the vehicle operator pressing inwardly on shaft 26 for its full travel to bring the same into contact with extension 145 precisely as described above with respect to the form of FIG. 1. Thus the action of the vehicle operator is identical under all of the circumstances described with the devices of both FIGS. 1 and 2, the latter including structure effective to preclude loss of fluid pressure to a diminished or depleted alternate source B.

The embodiments of the invention in which an exclusive property or privilege is claimed are defined as follows:

1. In a hand control valve for fluid pressure brake systems, a valve housing, a normal fluid pressure inlet in said housing, a fluid pressure outlet in said housing, an exhaust outlet in said housing, an alternate fluid pressure inlet in said housing, a shaft reciprocal in said housing and extending externally thereof for manual operation, a first valve member slidable on said shaft and having a larger valve face positioned for closing said exhaust outlet at one position of said first valve member and a second, smaller valve face positioned for closing communication between said first inlet and said pressure outlet in another position of said first valve member, yielding means urging said shaft outwardly of said housing and said first valve member toward said other position, an abutment on said shaft and engageable with said first valve member in response to outward movement of said shaft whereby said first valve member is urged by said first yielding means into said other position of said first valve member, a second valve member controlling communication between said alternate pressure inlet and said pressure outlet, said first valve being movable into said one position in response to inward movement of said shaft a predetermined distance, said shaft having a distal portion positioned for operating contact with said second valve member in response to further inward movement of said shaft, and a second yielding means, of greater force than that of said first yielding means and engaging said shaft and said first valve member to urge the same in opposite directions.

2. The structure of claim 1 characterized by and including sealing means carried by said shaft and movable into a position sealing said first inlet against communication with said fluid pressure outlet and said exhaust outlet when said shaft has moved a predetermined position inwardly of said housing.

3. The structure of claim 2 wherein said housing includes a chamber surrounding said shaft, said chamber includes an enlarged diameter portion, said first pressure inlet communicates with said enlarged portion and said shaft seal is positioned for movement between a nonsealing position with said enlarged portion and a sealing position within said chamber, said shaft seal being movable into said sealing position in response to said further inward movement of said shaft.

4. The structure of claim 1 wherein said first and second yielding means surround said shaft and said first yielding means surrounds said second yielding means.

5. The structure of claim 1 characterized by and including a third yielding means urging said second valve member into a position closing said pressure outlet against communication with said alternate pressure inlet in the absence of operating contact between said second valve member and said shaft and a chamber surrounding said second valve member and providing fluid pressure from said alternate inlet to urge said second valve member into said closing position.

6. A hand control valve including a housing, a first inlet and a second inlet in said housing, a pressure outlet and an exhaust outlet in said housing, independent first and second valve members controlling communication respectively between said first and second inlets with said pressure outlet, said first valve member controlling communication of said pressure outlet with said exhaust outlet, an operating shaft movable in said housing between a rear position, a first forward position and a second forward position, a spring overtravel connection between said shaft and said first valve member and effective to move said first valve member in response to movement of said shaft from said rear to said first forward position, said spring connection urging said shaft and first valve member in opposite directions and being ineffective to prevent movement of said shaft relative to said first valve member from said first to said second forward position, said shaft having a portion movable into operating contact with said second valve member when said shaft is moved from said first to said second forward position.

7. The structure of claim 6 characterized by and including a seal carried by said shaft and movable into sealing engagement with said housing to seal said first inlet as said shaft is moved from said first to said second forward position.

8. The structure of claim 6 wherein said second valve member includes a shuttle assembly, said shuttle assembly including a valve element movable in response to fluid pressure at said outlet above a predetermined level into a position opening said second inlet to flow of pressure from said outlet to said second inlet and movable in response to an excess of fluid pressure at said second inlet over that in said outlet to preclude the flow of fluid pressure from said second inlet to said outlet.

9. The structure of claim 8 wherein said valve element is operable by said shaft to permit flow of fluid pressure from said second inlet to said outlet.

* * * * *